United States Patent
Jaini et al.

(10) Patent No.: US 9,973,828 B1
(45) Date of Patent: *May 15, 2018

(54) MONITORING CONTENT CONSUMPTION BY RESTRICTED ACCOUNT

(71) Applicant: Google Inc., Mountain View, CA (US)

(72) Inventors: Shiva Jaini, Santa Clara, CA (US); Kevin Dame, San Francisco, CA (US); Robert Lee Thompson, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/288,427

(22) Filed: Oct. 7, 2016

Related U.S. Application Data (63) Continuation of application No. 14/472,281, filed on Aug. 28, 2014, now Pat. No. 9,491,176.

(51) Int. Cl.
*H04L 9/32* (2006.01)
*H04N 21/6334* (2011.01)
*H04N 21/254* (2011.01)

(52) U.S. Cl.
CPC ..... *H04N 21/6334* (2013.01); *H04N 21/2541* (2013.01)

(58) Field of Classification Search
CPC ....... G06F 21/10; G06F 21/62; H04L 2209/60
See application file for complete search history.

(56) References Cited

U.S. PATENT DOCUMENTS

| 2010/0153566 A1 | 6/2010 | Sheleheda et al. |
| 2013/0132232 A1* | 5/2013 | Pestoni ............... H04L 63/10 |
| | | 705/26.25 |

FOREIGN PATENT DOCUMENTS

WO WO-2014/042607 A1 3/2014

OTHER PUBLICATIONS

"Get Answers with Cell Phone Monitoring" SPY, 3 pages, [Online], [retrieved Jun. 3, 2014], Retrieved from the Internet, <http://www.mobile-spy.com/cell-phone-monitoring.html>.
U.S. Office Action, U.S. Appl. No. 14/472,281, dated Feb. 11, 2016, 8 pages.

* cited by examiner

*Primary Examiner* — Izunna Okeke
(74) *Attorney, Agent, or Firm* — Lowenstein Sandler LLP (57) ABSTRACT

A content server stores digital content including video, audio, image, animation, or text content. The content server receives account permissions governing video access for a restricted account that an authorizing account supervises. The content server also receives a designation by the authorizing account of a delegate account authorized to control video access for the restricted account. The content server receives a request from the restricted account to view a video and determines whether the restricted account may view the video according to the account permission. In response to determining that the authorized account is not authorized to view the requested video, the content server transmits an authorization request to the delegate user, who provides authorization for the restricted account to view the video. In response to authorization from the delegate account, the content server transmits the video to the restricted user.

26 Claims, 7 Drawing Sheets

MONITORING CONTENT CONSUMPTION BY RESTRICTED ACCOUNT

CROSS-REFERENCE TO RELATED APPLICATION

This application is a continuation of prior application Ser. No. 14/472,281, filed Aug. 28, 2014, which is incorporated herein by reference.

BACKGROUND

1. Field

The disclosure generally relates to the field of distributing digital content, and in particular, to controlling access to digital content by users.

2. Description of the Related Art

Content servers allow users to upload digital content (also referred to as media) such as videos, audio, images, and/or animations. Other users may view the digital content using client devices to browse digital content hosted on content servers. Content servers store a wide variety of content, including some content that may be inappropriate for some users.

Content servers may provide users an option to browse in a safe mode. When users enable safe mode, content servers remove potentially inappropriate content from search results for those users. This approach may be unsuitable for users who have more nuanced views about appropriate digital content. For example, a user might tolerate digital content depicting profanity and sexuality but might shun digital content depicting violence. A simplistic categorization of digital content as "safe" or "unsafe" does not account for varying user amenability to content with different characteristics.

SUMMARY

A content server stores digital content including video, audio, image, animation, or text content, which users of the content server may upload. In one embodiment, a content server receives account permissions from an authorizing user associated with an authorizing account. The account permissions govern video access for a restricted account that the authorizing account supervises. The content server stores these account permissions. Additionally, the content server receives a designation of a delegate account, which is authorized to control video access by the restricted account, from the authorizing user.

The content server receives a request to view a video from a client device associated with the restricted account. In response to the request, the content server determines by retrieving the account permissions whether the restricted account is authorized to view the requested video. If the restricted account is authorized to view the requested video, the content server transmits the requested video. In response to determining that the restricted account is not authorized to view the requested video, the content server transmits an authorization request to the authorizing user or the delegate user. If either the authorizing user or the delegate user responds positively to the authorization request, the content server transmits the requested video to the client device.

In one embodiment, the content server transmits a notification to a supervising user (including the authorizing user and a designated delegate user) whenever the restricted account views a video. The content server may provide synchronized presentation of a video that the restricted account is viewing to a supervising user. To provide synchronized presentation, the content server identifies a portion of the requested video that the client device is concurrently presenting and transmits the identified portion to the supervising user. In response to viewing the notification or the synchronized presentation of the video, the supervising user may instruct the content server to revoke the restricted account's access to the video.

In one embodiment, the account permissions include conditions based on content-based rules and contextual rules. Example content-based rules specify metadata or other properties associated with a video. Example contextual rules specify a time or a location. Account permissions may prohibit access to videos meeting certain conditions or may designate videos meeting certain conditions as permissible for restricted account. Other account permissions may designate videos meeting certain conditions as questionable. A restricted account may view a video designated as questionable with authorization from a supervising user.

The disclosed embodiments include a computer-implemented method, a system, and a non-transitory computer-readable medium. The features and advantages described in this summary and the following description are not all inclusive and, in particular, many additional features and advantages will be apparent in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description and the accompanying figures. A brief introduction of the figures is below.

DETAILED DESCRIPTION

The figures and the following description relate to particular embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

I. System Architecture

Figure 1:
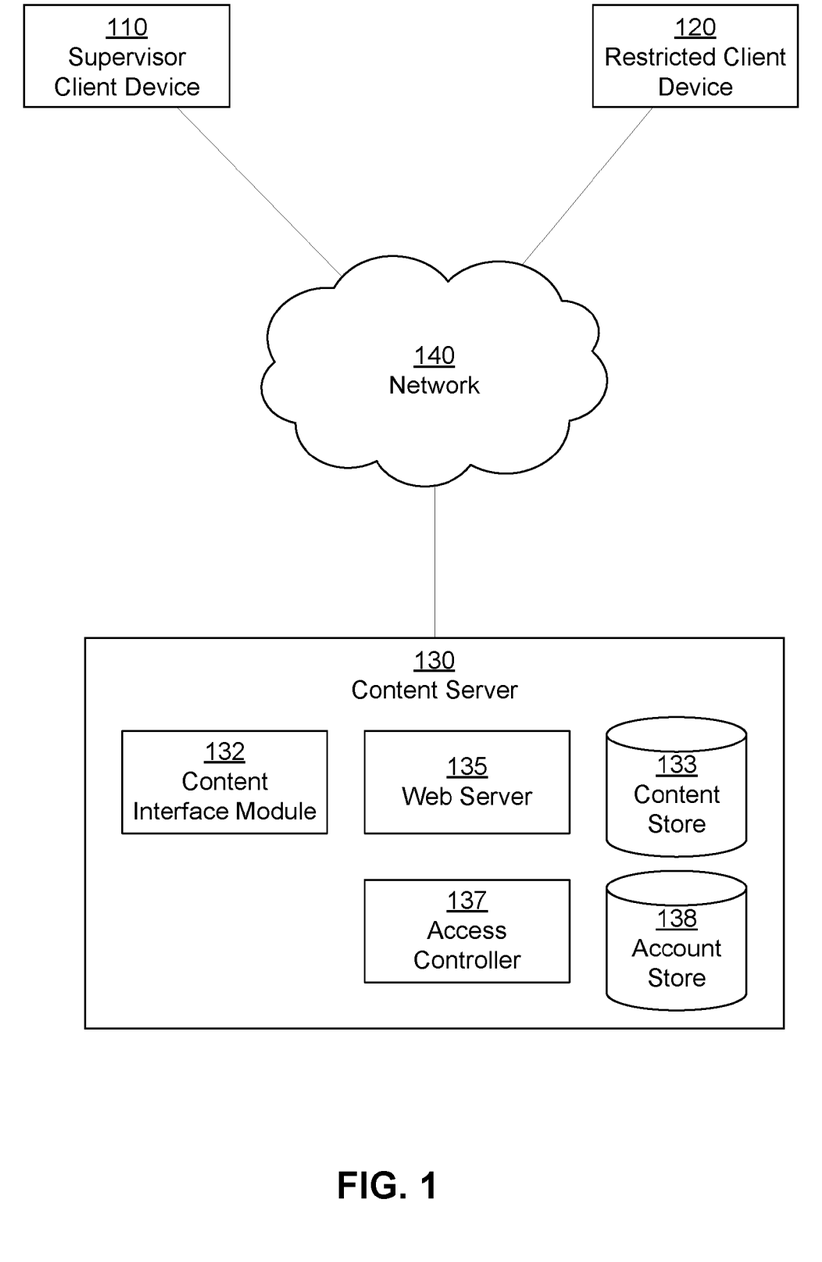
FIG. 1 is a block diagram of a networked environment for viewing digital content, in accordance with an embodiment.

FIG. 1 illustrates a block diagram of a networked environment for sharing digital content, in accordance with one embodiment. The entities of the networked environment include a supervisor client device 110, a restricted client device 120, a content server 130, and a network 140. Although single instances of the entities are illustrated, multiple instances may be present. For example, multiple client devices 110 and 120 associated with multiple users request and present digital content. The functionalities of the entities may be distributed among multiple instances. For example, a content distribution network of servers at geographically dispersed locations implements the content server 130 to increase server responsiveness and to reduce digital content loading times.

A client device 110 or 120 accesses the content server 130 through the network 140. By accessing the content server 130, the client device 110 or 120 may perform content server functionality such as browsing digital content, presenting digital content, or uploading digital content. Presenting digital content includes playing a video or audio file as well as displaying an image or animation.

Figure 7:
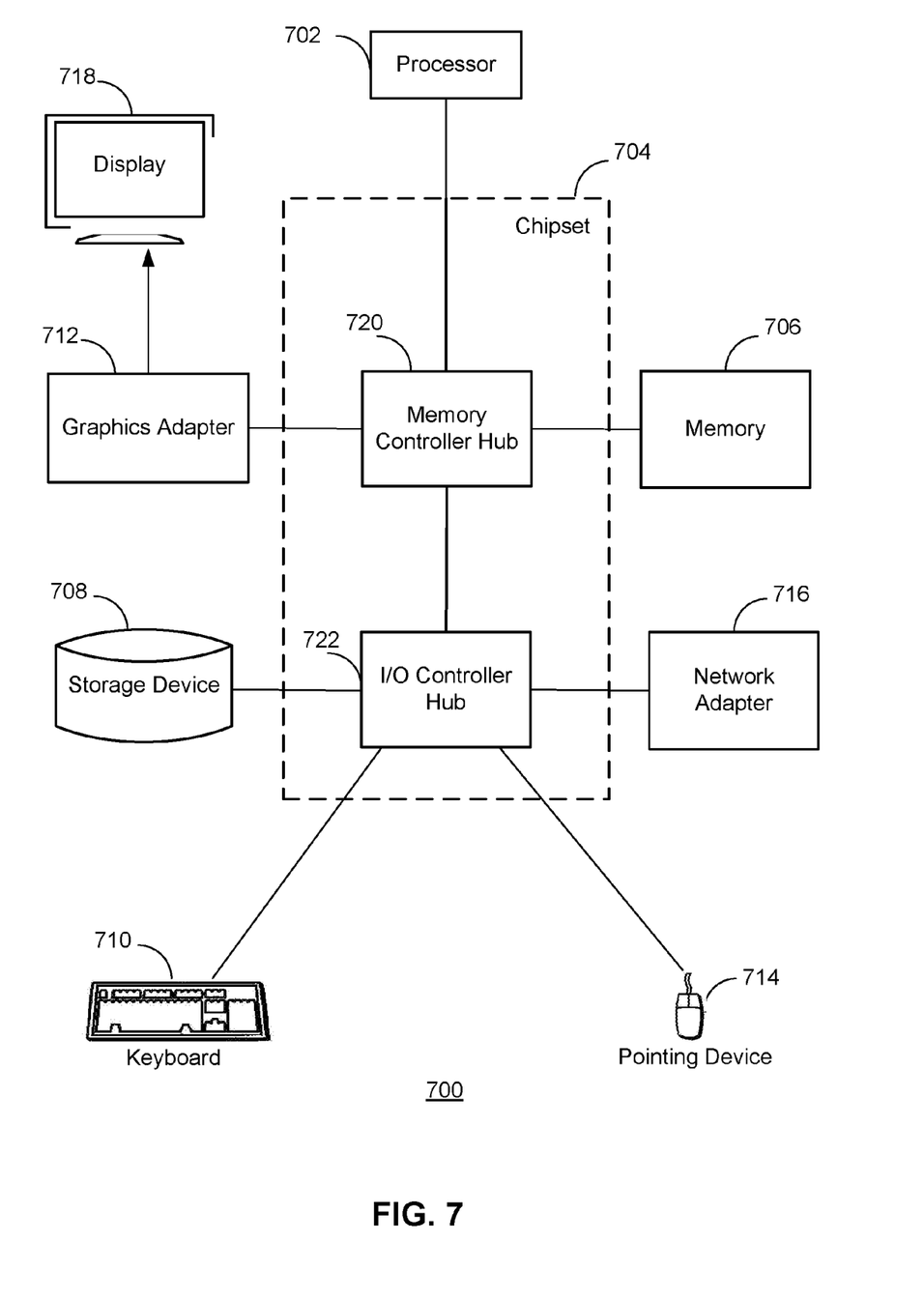
FIG. 7 is a high-level block diagram illustrating an example computer usable to implement entities of the content sharing environment, in accordance with one embodiment.

In one embodiment, the client device 110 or 120 is a computer, which is described further below with respect to FIG. 7. Example client devices 110 or 120 include a desktop, a laptop, a tablet, a mobile device, a smart television, and a wearable device. The client device 110 or 120 may contain software such as a web browser or other application for presenting digital content from the content server 130. The client device 110 or 120 may include software such a video player, an audio player, or an animation player to support presentation of digital content.

In general, a supervisor client device 110 refers to a client device operated by a supervising user of a supervisor account or refers to the supervising user. The supervisor client device 110 is used by a supervising user who has created a supervisor account with the content network 130. The supervisor client device 110 accesses supervisor functionality including monitoring or controlling access to digital content by a restricted user. The restricted user has a restricted account used to access the content server 130 through a restricted client device 120. In general, a restricted client device 120 refers to a client device operated by a restricted user of a restricted account, or refers to the restricted user. For example, the supervising user is a parent or manager, and the corresponding restricted user is a child of the parent or an employee of the manager.

Functionality available to a supervisor account includes monitoring activity of a corresponding restricted account as well as controlling content server functionality available to the corresponding restricted account. Monitoring activity refers to receiving reports of other indicators of restricted account activity on the content server 130, including current activity or historical activity. For example, a supervising user receives notifications when the corresponding restricted user watches a video through the content server 130. As another example, a supervising user may view a video concurrently transmitted to the corresponding restricted client device 120.

In various embodiments, controlling content server functionality refers to determining functionality available to a restricted user. Content server functionality available to a user includes accessing digital content, uploading digital content, or interacting with other users of the content server 130. For example, a supervising user may revoke restricted account access to a video or respond to a restricted account's request for authorization to view a video. As another example, a supervising user may limit, review, or remove uploads made through a restricted account.

Supervising users include both authorizing users, who access the content server 130 through an authorizing account, and delegate users, who access the content server 130 through a delegate account. An authorizing user exerts full administrative control over the restricted user and may appoint a delegate user to exert partial administrative control over the restricted user. For example, the authorizing user is a child's parent, and the delegate user is the child's older sibling, babysitter, or other caregiver. As another example, the authorizing user is an employee's high-level supervisor, and the delegate user is the employee's direct supervisor. An authorizing user may create a restricted account supervised by the authorizing account, may configure settings of the restricted account, including account permissions, and may authorize delegate users to supervise the restricted account.

To streamline content access management, a user of an authorizing account may configure restricted account permissions, which govern content server functionality available to the restricted user. Some account permissions govern digital content accessible to the restricted user. The content server 130 uses these account permission to determine if digital content is prohibited, permissible, or questionable for a restricted account. Prohibited digital content is digital content inaccessible (via the content server 130) by a restricted client device 120. Permissible digital content is digital content accessible (via the content server 130) by a restricted client device 120 without a supervising user authorizing access to the requested item of digital content. Questionable digital content is digital content accessible (via the content server 130) to a restricted client device 120 with authorization by a supervising user, where the authorization is specific to the requested item of digital content.

A delegate account can perform general functions of a supervisor account (e.g., receiving video access notifications, reviewing permissions requests, revoking video access) but cannot perform all the functions available to the authorizing account (e.g., appointing delegate users, establishing account permissions). In one embodiment, an authorizing account may customize supervisor functionality available to a delegate account. For example, an authorizing user permits an authorizing user to receive notifications of videos currently viewed by a restricted account but not to view the restricted account's previous watch history.

The restricted client device 120 accesses content server functionality subject to limitations imposed by a supervising user. For example, if the content server 130 is providing a video to the restricted client device 120 (e.g., by streaming the video), and if a supervisor account revokes access to the video, then the content server 130 stops providing the video to the restricted client device 120. As another example, if a restricted client device 120 is presenting a downloaded video, and if the supervisor account revokes access to the video, then the content server 130 instructs the restricted client device 120 to stop presenting the video. As another example, if a restricted user of a restricted account cannot access a video, then the restricted user may request authorization from a supervising user of a supervisor account. Responsive to receiving authorization from a supervisor account, the restricted client device 120 presents the video.

The network 140 enables communications among the entities connected to them through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. The networking protocols used on the network 140 may include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

II. Content Server

The content server 130 stores digital content uploaded by a user through a client device 110 or 120 and serves uploaded digital content to a viewing user through a client device 110. The content server 130 may also store digital content acquired from content owners (e.g., production companies, record labels, publishers). In one embodiment, the content server 130 includes a content interface module 132, a content store 133, a web server 135, an access controller 137, and an account store 138. The functionality of the illustrated components may be distributed (in whole or in part) among a different configuration of modules. Some described functionality may be optional; for example, in one embodiment the content server 130 does not provide a content interface module 132.

The content server 130 stores uploaded digital content in the content store 133. The content store 133 may include the digital content itself (e.g., the audio or video file) or a pointer thereto (e.g., a memory address, a uniform resource identifier (URI), an internet protocol (IP) address). The content store 133 also houses metadata associated with the digital content. Metadata are properties of the digital content and may indicate the digital content's source (e.g., an uploader name, an uploader user identifier) and/or attributes (e.g., a video identifier, a title, a description, a file size, a file type, a frame rate, a resolution, an upload date, a channel including the digital content).

The content store 133 also stores content categorizations associated with digital content. Content categorizations are metadata indicating the suitability of digital content for various groups of users. Content categorizations may summarize or quantify potentially offensive matter in digital content (e.g., violence, profanity, nudity, sexuality, misogyny, heteronormativity, bigotry, racism, religious intolerance, narcotic use, drug use, tobacco use, alcohol use, moral turpitude). Content categorizations may include ratings assigned to digital content by an external organization (e.g., suggested age range, recommendations tailored to a particular ideology).

The content interface module 132 generates a content interface used to access content server functionality, including browsing, presenting, and uploading digital content. The content interface may include a media player (e.g., a video player, an audio player, an image viewer) that presents content. The content interface module 132 may retrieve and display metadata associated with the digital content from the content store 133 such as a title, upload data, an uploader user identifier, and content categorizations. The content interface module 132 may incorporate a search interface or a recommendation interface for browsing content.

The content interface module 132 may generate a limited or modified content interface for restricted accounts based on access determinations by the access controller 137. The content interface module 132 may also generate additional interfaces for supervisor accounts to configure account permissions and to monitor restricted account activity. The content interface module 132 is described further in conjunction with FIG. 2B.

The access controller 137 determines content server functionality available to a restricted account. In particular, the access controller 137 produces access determinations indicating whether an item of digital content is prohibited, permitted, or questionable. In one embodiment, the content server 130 transmits permitted content but not prohibited content to a restricted client device 120. The content server 130 transmits questionable content to the restricted client device 120 if authorization is received from a supervising user. In one embodiment, the restricted client device 120 may request authorization for questionable content but not for prohibited content. In an alternative embodiment, the content server 130 makes access determinations that do not include a subset of the prohibited, permitted, and questionable categories. For example, the access controller 137 determines whether content is permitted or questionable but does not determine whether content is prohibited. As another example, the access controller 137 determines whether content is permitted or prohibited but does not determine whether content is questionable.

Besides producing access determinations for digital content, the access controller 137 determines whether a restricted account may access other content server functionality, including uploading digital content. In one embodiment, a client device 110 or 120 captures a video recording (or audio recording) of a user concurrently with presenting digital content (typically audio or video) as part of a "karaoke mode." The access controller 137 determines whether a restricted user may upload digital content, including digital content captured during karaoke mode. The access controller 137 is described further in conjunction with FIG. 2A.

The account store 138 contains account profiles of content server users. An account profile includes information provided by a user of an account to the content server, including a user identifier, access credentials, and user preferences. An account profile indicates relationships with other accounts. For example, an account profile of a supervisor account includes a user identifier of a restricted account corresponding to the supervisor account. An account may be a supervisor account with respect to a restricted account while simultaneously being a restricted account with respect to another supervisor account. Insofar as the account store 138 contains personal information provided by a user, a user's account profile includes privacy settings established by a user to control use and sharing of personal information.

The account store 138 contains account permissions established by an authorizing user. In general, account permissions in the account store 138 are conditional rules. An account permission specifies one or more conditions as well as an access determination (e.g., permissible, questionable, prohibited) made if the conditions are met.

The conditional rules in account permissions include content-based rules, contextual rules, or a combination thereof. A content-based rule applies to a digital content request if the metadata of the requested digital content matches metadata specified by the content-based rule. Example metadata in a content-based rule includes a title, a channel, an uploading account, a content categorization, an associated personality (e.g., actor, artist, comedian, composer, author, director, producer), a grouping of digital content (e.g., by genre, by show, by franchise, by series, by distributor), or a combination thereof. A contextual rule applies to a digital content depending on the situation in which the digital content was requested. For example, contextual rules are based at least in part on a request time by the restricted user, a geographic location of the restricted client device 120 at the request time, a geographic location of the corresponding supervisor client device 110 at the request time, or a combination thereof.

The web server 135 links the content server 130 via the network 140 to the client devices 110 and 120. The web server 135 serves web pages, as well as other content, such as JAVA®, FLASH®, XML and so forth. The web server 135 may receive uploaded content items from the one or more client devices 110. Additionally, the web server 135 communicates instructions from the content interface 125 for viewing digital content and for processing received input from a user of a client device 110. Additionally, the web server 135 may provide application programming interface (API) functionality to send data directly to an application native to a client device's operating system, such as IOS®, ANDROID™, or WEBOS®.

III. Access Controller

Figure 2A:
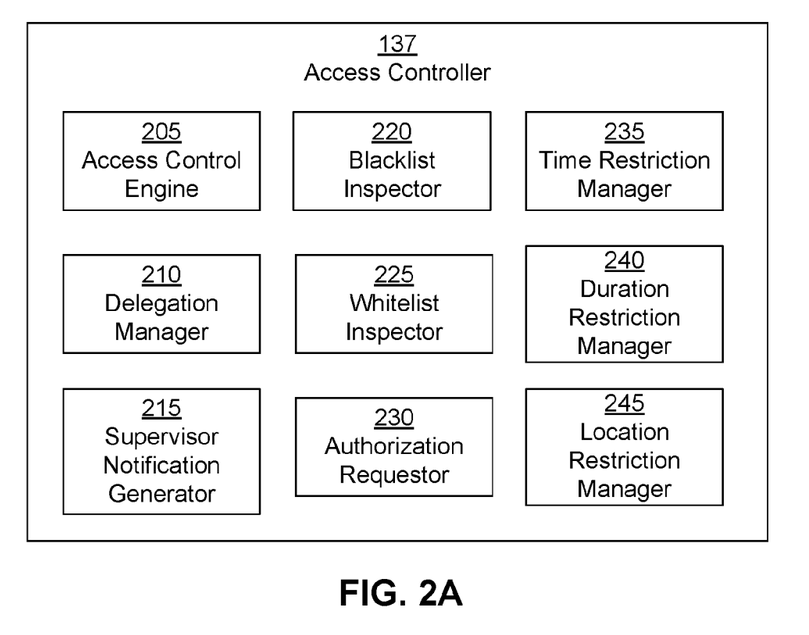
FIGS. 2A and 2B are block diagrams of an example access controller and an example content interface, respectively, in accordance with an embodiment.

FIG. 2A is a block diagram of the example access controller 137, in accordance with an embodiment. The access controller 137 includes an access control engine 205, a delegation manager 210, a notification generator 215, a blacklist inspector 220, a whitelist inspector 225, an authorization requestor 230, a time restriction manger 235, duration restriction manager 240, and a location restriction manager 245.

The access control engine 205 queries the modules 215-245 to make an access determination with respect to a given content item in response to a request from a restricted client device 120. In one embodiment, the modules 215-245 consult an access rules database (not illustrated). An entry of the access rules database includes descriptive information about an access rule, inputs from an authorizing user to configure the access rule, and deterministic logic to make an access determination with respect to the access rule for a given item of digital content. The modules 215 and 230 consult a supervisor to make a supervisor-based access determination. The modules 220 and 225 query content-based rules among the account permissions in the account store 138 to make a content-based access determination. The modules 235, 240, and 250 query contextual rules among the account permissions in the account store to make a contextual access determination. The access control engine 205 synthesizes preliminary access determinations made by the modules 215-245 to output a final access determination. For example, some of the modules 215-245 (e.g., those that do not find a relevant account permission) do not make an access determination, but the access determinations made by the other modules (e.g., those that do find a relevant account permission) are synthesized by the access control engine 205.

In one embodiment, the access control engine 205 outputs the most restrictive access determination determined by the modules 210-245. For example, if a contextual rule indicates that a user is allowed to view content, but a content-based rule indicates that the requested digital content is prohibited, then the final access determination is that the digital content is prohibited.

In one embodiment, the access control engine 205 prioritizes access determinations from different modules to resolve conflicting access determinations. The access control engine 205 may consult a ranking of access rules. The ranking of access rules may include some hard-coded rankings applied across all accounts. For example, the access control engine 205 prioritizes access rules concerning instructions from a supervising user about a particular item of digital content over a generic content-based rule. The ranking of access rules may be configurable by an authorizing user. For example, an authorizing user specifies (e.g., as part of configuring an authorizing account) that content-based access rules rank above contextual rules. In one implementation, if the whitelist inspector 225 indicates that the digital content is permissible, but if the notification generator 215 indicates that the digital content is prohibited, then the access control engine 205 determines that the digital content is prohibited because the notification generator 215 ranks above the whitelist inspector 225.

The delegation manager 210 determines whether a particular account is a delegate account with respect to a restricted account by querying account preferences configured by an authorizing user. For example, an entry in the account store 138 corresponding to a delegate account includes one or more paired listings of: (a) a restricted account that the delegate user supervises, and (b) an authorizing account that authorized the delegate user to supervise the restricted account. Similarly, an entry for a restricted account indicates an authorizing account supervising the restricted account as well as any delegate accounts designated by the authorizing user to supervise the restricted account. The authorizing user designates a delegate account as a supervising user with respect to a restricted account through an interface to configure preferences of the authorizing account. In one embodiment, an authorizing account may unconditionally designate an account as a delegate account with respect to a restricted user. Alternatively or additionally, an authorizing account conditionally designates an account as a delegate account based on contextual rules (e.g., time, location, location relative to the client device 120). For example, a parent with an authorizing account designates an account of a teacher as a delegate account supervising a restricted account of the parent's child during the school day but not during the evening. The contextual rule may be based on the location of client device 110 or 120 of the authorizing user, the delegate user, or the restricted user. The contextual rule may also be based on a location of one of the entities' client device 110 or 120 relative the location of another of the entities' client device 110 or 120. For example, a babysitter is a delegate account relative to a restricted account when the supervisor client device 110 of the babysitter is within a threshold location of the restricted client device 120 that the restricted user is using.

III.A. Supervisor-Based Access Determination

The notification generator 215 notifies the supervisor client device 110 in response to the restricted client device 120 presenting or requesting digital content. A generated notification includes metadata suitable to describe the digital content to the supervising user. For example, the notification may include a title, a brief description of the digital content, and content categorizations associated with the digital content. The notification may also include a preview portion of the digital content (e.g., a preview image) or a pointer to the digital content for the supervising user to review. The notification generator 215 may receive access revocation requests from a supervisor client device 110 regarding particular digital content. In response to an access revocation request, the notification generator 215 determines that the particular digital content is prohibited.

The authorization requestor 230 generates an authorization request responsive to a restricted client device 120 requesting access to questionable content. Similar to a notification request, the authorization request includes relevant metadata, a preview portion, and/or a pointer to the requested content. The content server 130 transmits the authorization request to the supervisor client device 110 (e.g., via email, via text message, via a web browser, via a push notification to an application associated with the content server 130 and native to the operating system of the supervisor client device 110). The authorization requestor 230 receives, from the supervisor client device 110, an authorization response, which indicates whether the digital content is permissible or prohibited. The authorization response may be received through communication channels similar to those used to transmit the authorization request.

III.B. Content-Based Access Determination

The blacklist inspector 220 performs an access determination by consulting content-based access rules specifying prohibited or questionable content. In one embodiment, the account store 138 stores the content-based access rules corresponding to a particular restricted account. The stored content-based access rules specify parameters used to determine if a content-based access rule applies to an item of digital content, and what access determination to make if the content-based access rule applies. If digital content is associated with metadata that matches a content-based access rule, then the blacklist inspector 220 applies the access determination specified by the access rule to the digital content. For example, an access rule specifies that if digital content depicts a comedian who regularly uses foul language, then the digital content is questionable. As another example, an access rule specifies that if digital content is associated with a particular content categorization (e.g., pervasive violence), then the digital content is prohibited.

The whitelist inspector 225 performs an access determination by consulting content-based access rules specifying permissible content. If digital content is associated with metadata that matches a content-based access rule, then the whitelist inspector 225 applies the access determination specified by the access rule to the digital content. For example, an access rule indicates that if digital content was produced in association with the Corporation by Public Broadcasting, then the content is permissible, subject to another access rule with high priority. As another example, an access rule specifies that if digital content is associated with a particular content categorization (e.g., rated "PG" by the Motion Picture Association of America), then the digital content is permissible.

In one embodiment, the whitelist inspector 225 determines that digital content is permissible for a restricted account only if the digital content matches a content-based access rule indicating that the content is permissible. Hence, if no content-based access rules indicate that digital content is permissible, the whitelist inspector 225 defaults to determining that the digital content is prohibited. For example, the whitelist inspector 225 consults a content-based access rule indicating that a video is permissible if the video is rated as suitable for children twelve and under (as determined from a content categorization received from an external organization). In this example, the whitelist inspector 225 determines that an unrated video (i.e., a video without a suitable rating indicated in a content categorization) is prohibited.

In some cases, the blacklist inspector 220 and the whitelist inspector 225 may make contradictory access determinations. In one embodiment, a content-based access rule indicates that the content-based access rule ranks above one or more other access rules and is hence an exception to those other access rules. To resolve conflicts, the access control engine 205 may modify the ranking of access rules to reflect an exception indicated by an access rule. For example, the blacklist inspector 220 designates digital content as prohibited due to a blacklist rule (e.g., due to a restricted rating from an external organization), but the whitelist inspector 225 identifies a whitelist access rule that acts as an exception to the blacklist rule (e.g., the digital content has a restricted rating only because of profanity). In this example, the access control engine 205 uses the exception embedded in the whitelist rule to determine that the whitelist rule ranks above the blacklist rule, so the digital content is therefore permissible.

III.C. Contextual Access Determination

The time restriction manager 235 performs an access determination according to when the restricted account requested the digital content. The time restriction manager 235 obtains the request time and identifies one or more contextual rules that apply at the request time. The time restricted manager may compare the current time to time ranges specified by time-based contextual rules. If the current time is within the time range specified by a time-based contextual rule, then that time-based contextual rule applies. Based on the identified one or more contextual rules, the time restriction manager 235 determines whether the digital content request is permissible, questionable, or prohibited. For example, the time restriction manager 235 determines that a content request from an employee's restricted account is questionable because it occurs during the employee's workday.

The duration restriction manager 240 performs an access determination according to the duration of time the restricted account has viewed digital content. The duration restriction manager 240 determines the duration of time that a restricted account has viewed digital content and identifies one or more contextual rules that apply to the determined duration. The duration restriction manager 240 may determine the duration of time by summing or otherwise combining watch times recorded in an activity history of the restricted account. To identify contextual rules that apply based on the determined duration, the duration restriction manager 240 compares the determined duration to a threshold duration specified by the contextual rule. For example, if the determined duration equals or exceeds a threshold duration of a contextual rule, then the contextual rule applies. Based on the identified one or more contextual rules, the duration restriction manager 240 performs the access determination. For example, the duration restriction manager 240 determines that a content request for cartoons is prohibited because the requesting restricted account has watched non-educational content for more than a threshold duration of time on the day the cartoon was requested.

The location restriction manager 245 performs an access determination according to a geographic location of a client device 110 or 120 associated with the restricted account. The location restriction manager 245 obtains the geographic location of a relevant client device 110 or 120 and identifies one or more contextual rules that apply to the determined one or more locations. The geographical location of the client device 110 or 120 may be inferred from a network path of an interaction between the client device 110 or 120 and the content server 130 (e.g., based on a location associated with an IP (internet protocol) address). The geographical location may also be transmitted by the client device 110 or 120 (e.g., a set of global positioning system coordinates). The location restriction manager 245 identifies applicable contextual rules by comparing the location of the client device 110 or 120 to one or more locations specified by a contextual rule. For example, if the client device 110 or 120 is within a threshold distance of the specified location, then the contextual rule applies. Based on the identified one or more contextual rules, the location restriction manager 245 performs the access determination. For example, the location restriction manager 245 determines that a request for digital content from a child's restricted account is prohibited because the child's restricted client device 120 is not at home.

In one embodiment, the location restriction manager 245 performs an access determination by comparing the geographic location of a restricted client device 120 to the geographic location of a corresponding supervisor client device 110. The location restriction manager 245 determines a geographic distance between the location of the restricted client device 120 and the location of a corresponding supervisor client device 110 (e.g., the closest supervisor client device 110). Based on a comparison of the distance to a threshold distance, the location restriction manager 245 performs an access determination. For example, if the distance between the supervisor client device 110 and the restricted client device 120 equals or exceeds a threshold, then requested digital content is prohibited.

Insofar as the content server 130 collects geographic location data from a user's client device 110 or 120, the user may establish account permissions governing use of location data. For example, a restricted user may limit sharing of location data with other users, such as a supervising user.

IV. Content Interface Module

Figure 2B:
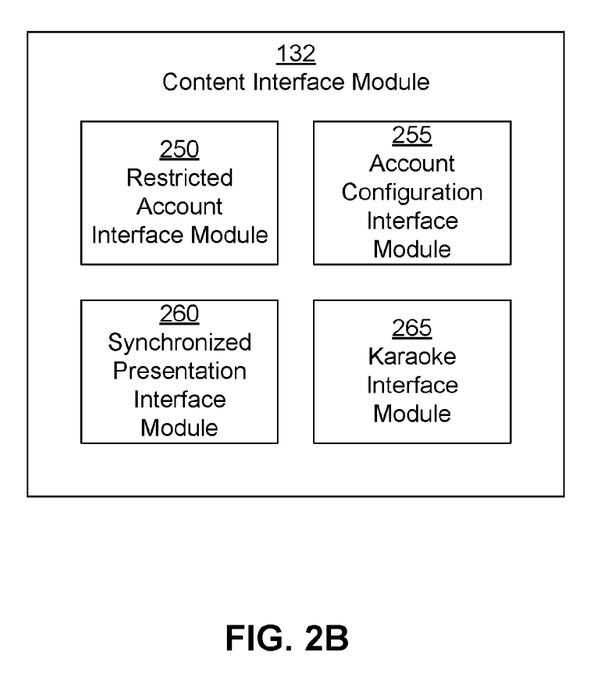

FIG. 2B is a block diagram of the example content interface 132, in accordance with an embodiment. The content interface module 132 includes a restricted account interface module 250, an account configuration interface module 255, a synchronized presentation interface module 260, and a karaoke interface module 265.

The restricted account interface module 250 generates a restricted account interface customized for a restricted account. In one embodiment, the restricted account interface module 250 modifies a generic content interface to remove digital content prohibited for the restricted account. The restricted account interface module 250 may suppress prohibited content, as determined by the access controller 137, from search results and recommended content displayed by the content interface. The restricted account interface displays questionable content and permissible content, as determined by the access controller, but the questionable content includes an indication that it is viewable responsive only to authorization from a supervising user. The restricted account interface module 250 may generate a sanitized preview of prohibited or questionable content. For example, this sanitized preview omits a preview image thumbnail and redacts text (e.g., in the title) signifying a potentially offensive concept.

The account configuration interface module 255 generates a supervisor interface for a supervising user to configure account settings. Using the supervisor interface, a supervising user may create a restricted account. Alternatively or additionally, a supervisor account may request that another account grant the supervising administrative control, thereby making the other account a restricted account. The supervisor interface also provides for configuration of restricted account permissions and other restricted account settings. Using the supervisor interface, a supervisor account may appoint a delegate account or establish contextual rules governing circumstances under which the delegate account is a supervisor account of a restricted account. The account store 138 is then updated to reflect the account settings or access rules modified or selected by the authorizing user.

The synchronized presentation interface module 260 generates a synchronized presentation interface. Using the synchronized presentation interface, a supervising user may view digital content concurrently watched by a restricted account. The synchronized presentation interface module 260 identifies a portion of the digital content being watched by the restricted user. For example, the portion is received from the restricted client device 120 or is identified from the last portion of content transmitted to the restricted client device 120. The synchronized presentation interface then presents the identified portion of the digital content through the supervisor client device 110. The synchronized presentation interface also includes controls for the supervising user to revoke content access.

The karaoke interface module 265 generates a karaoke interface for a supervising user to monitor a restricted user using karaoke mode. In karaoke mode, a user's client device 110 or 120 captures digital content while concurrently presenting other digital content. For example, a restricted client device 120 captures a user singing karaoke-style to the instrumental track from a popular song. In one embodiment, the karaoke interface presents the digital content transmitted to the restricted client device 120 alongside the digital content uploaded by the restricted client device 120. The karaoke interface also includes controls for the supervising user to terminate karaoke mode use by the restricted account or to revoke the restricted account's access to the transmitted digital content.

V. Access Determination

Figure 3:
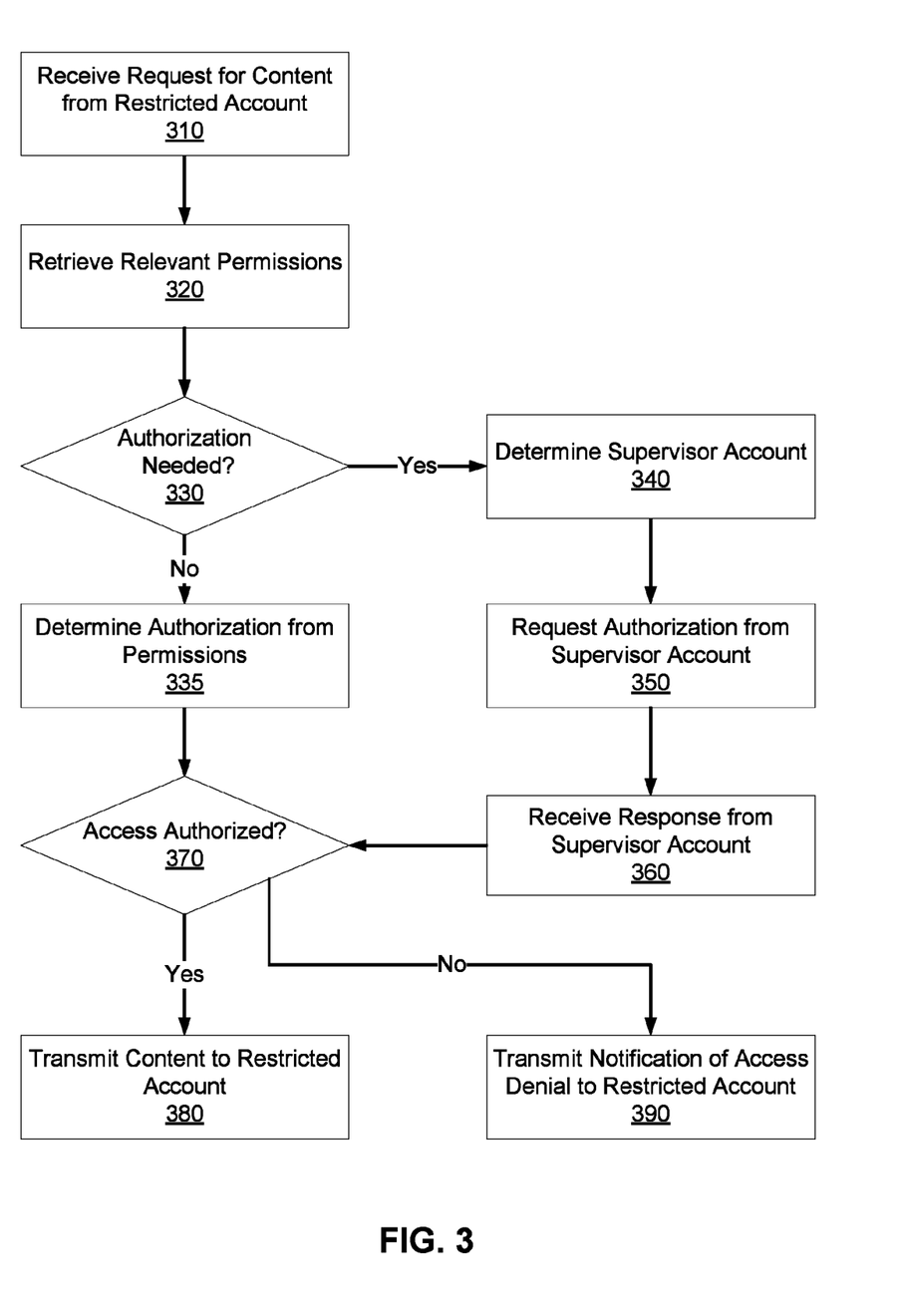
FIG. 3 is a flowchart illustrating an example process for determining whether to grant a restricted account access to digital content, in accordance with an embodiment.
Figure 4:
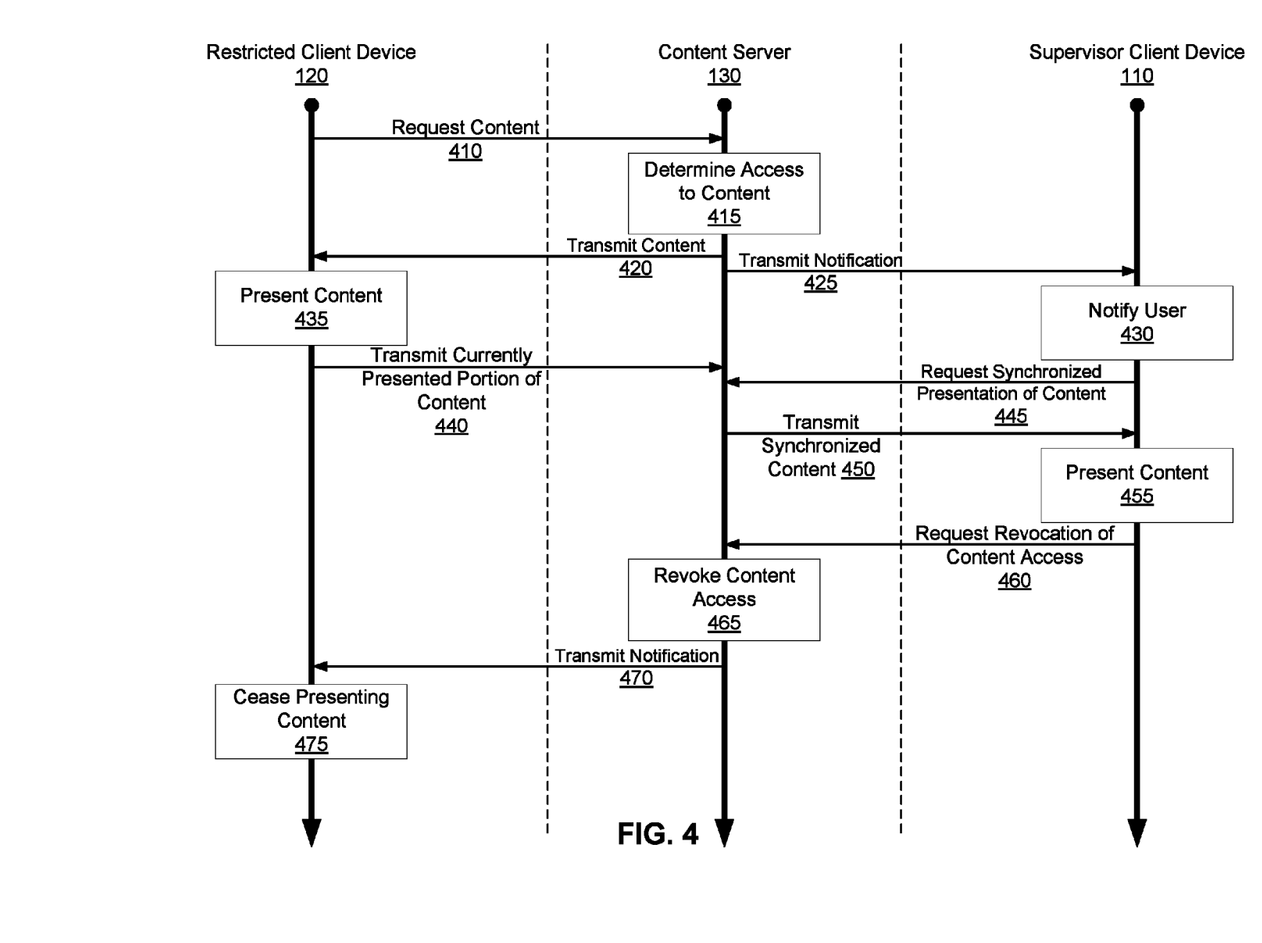
FIG. 4 is an interaction diagram illustrating an example process for monitoring of a restricted account by a supervisor account, in accordance with an embodiment.

FIG. 3 is a flowchart illustrating an example process for determining whether to grant a restricted account access to digital content, such as a video, in accordance with an embodiment. Although FIGS. 3 and 4 are described with respect to accessing a video, the methods and processes described herein may be implemented to control access to other digital content (e.g., audio, etc.).

The content server 130 receives account permissions from an authorizing user associated with an authorizing account. The account permissions govern video access by the restricted account. The content server 130 stores the account permissions in the account store 138. The content server 130 also receives, from the authorizing user, a designation of a delegate account authorized to control video access by the restricted account.

The content server 130 receives 310 a request to view a video from a restricted client device 120, which is associated with the restricted account. In response, the access controller 137 retrieves 320 relevant account permissions. For example, the access controller 137 identifies relevant content-based rules (that apply to the requested digital content) or contextual rules (that apply given the circumstances of the request). Based on the retrieved account permissions, the access controller 137 determines whether the user is authorized to view the requested video.

To determine whether the user is authorized to view the video, in one embodiment, the access controller 137 determines whether 330 authorization is needed from a supervisor account for the restricted account to view the video. For example, if the access controller 137 determines that the requested video is permissible or prohibited, then authorization is not needed. In this example, if the access controller 137 determines that the requested video is questionable, then authorization is needed.

Responsive to determining that authorization is needed for the restricted account to view the video, the access controller 137 determines 340 an appropriate supervisor account that may authorize access to the video. The content server 130 requests 350 authorization by transmitting an authorization request to the determined supervisor account. For example, the content server 130 transmits an authorization request to a delegate user associated with the delegate account designated by the authorizing user.

The content server 130 receives 360 a response to the authorization request from the supervisor account. The access controller 137 determines whether 370 access is authorized for the restricted user based on the response. For example, a response is received from a delegate user, who grants authorization for the restricted account to view the video. Accordingly, the access controller 137 determines that the requested video is permissible for the restricted account.

If 330 authorization from a supervisor account is not necessary, the access controller 137 determines 335 access based on the retrieved account permissions. For example, the access controller 137 determines 335 that the video is permissible or prohibited. Absent an intervention from a supervising user, the access controller determines whether 370 access is authorized from the account permissions alone.

If 370 access is authorized, then the content server 130 transmits 380 the requested video the restricted client device 120. For example, responsive to receiving a response from a delegate account authorizing access, the content server 130 transmits 380 the requested video. If 370 access is not authorized, then the content server 130 does not transmit the requested video and may transmit 390 a notification of access denial to the restricted account.

VI. Restricted Account-Supervisor Account Interaction

FIG. 4 is an interaction diagram illustrating an example process for monitoring of a restricted account by a supervisor account, in accordance with an embodiment.

A restricted client device 120 requests 410 a video. The content server 130 receives the digital content request and determines 415 that the restricted client device 120 is authorized to access the video (e.g., by the method described in conjunction with FIG. 3). The content server 130 transmits 420 the video to the restricted client device 120, which presents 435 the video. In one embodiment, the restricted client device 120 transmits 440 to the content server 130 the portion (or a pointer to the portion) of the video that it is presenting.

In response to transmitting the video, the content server 130 transmits 425 a notification to a supervisor client device 110 associated with at least one supervisor account (e.g., a delegate account, an authorizing account). The supervisor client device 110 notifies 430 the supervising user that the restricted user is viewing a video. The supervisor client device 110 may request 445 synchronized presentation of the video that the restricted user is watching.

In response to receiving a request for synchronized presentation of the video, the content server 130 identifies the portion of video that the user is viewing. For example, the content server 130 identifies what the restricted user is watching based on portions of the video recently transmitted to the restricted client device 120, the times the portions were transmitted, and the current time. The content server 130 may also identify the portion of the video from reports of the current portion transmitted 440 from the restricted client device 120. The content server 130 transmits 450 the identified portion of the video to the supervisor client device 110, which presents 455 the video in synchrony with the video presented on the restricted client device 120.

In response to a notification, or in response to concurrently watching the video, a supervising user may decide to revoke access to the video. The supervisor client device 110 transmits 460 a request for revocation of content access. In response to receiving the request, the content server 130 revokes 465 content access for the restricted account. The content server 130 may revoke 465 content access by ceasing video transmissions to the restricted client device 120 and/or transmitting an instruction mandating that the restricted client device's video player stop playing the video. In response to revoking content access for the restricted account, the content server 130 transmits a notification 470 of access revocation, and the restricted client device 120 ceases 475 presenting the video.

VII. Example User Interface

Figure 5:
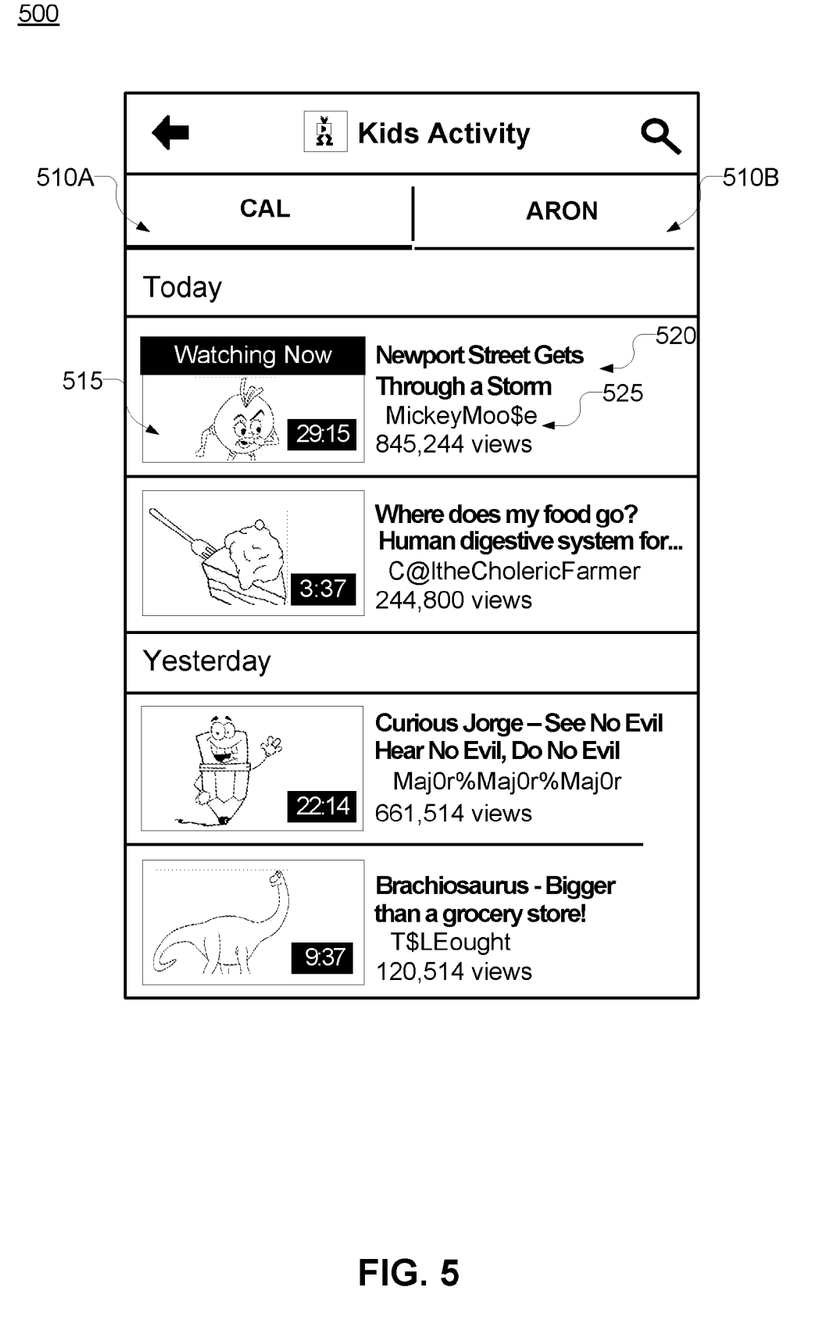
FIG. 5 is an example user interface for a supervising user to monitor digital content presented to a user of a restricted account.

FIG. 5 is an example user interface 500 for a user of a supervisor account to monitor digital content presented to a user of a restricted account. The user interface 500 lists digital content recently requested by a restricted account. If the supervising user manages multiple restricted accounts, then the user interface 500 includes buttons 510 to select a restricted account. In response to selection of one of the buttons 510A or 510B, the user interface 500 displays the watch history of the restricted account corresponding to the selected button 510A or 510B. Each listed video includes a preview portion 515 (e.g., a preview thumbnail), a title 520, and a username 525 (e.g., of the digital content's uploader or creator). The username 525 may also refer to a channel on the content server 130 through which the restricted account viewed the digital content.

Figure 6:
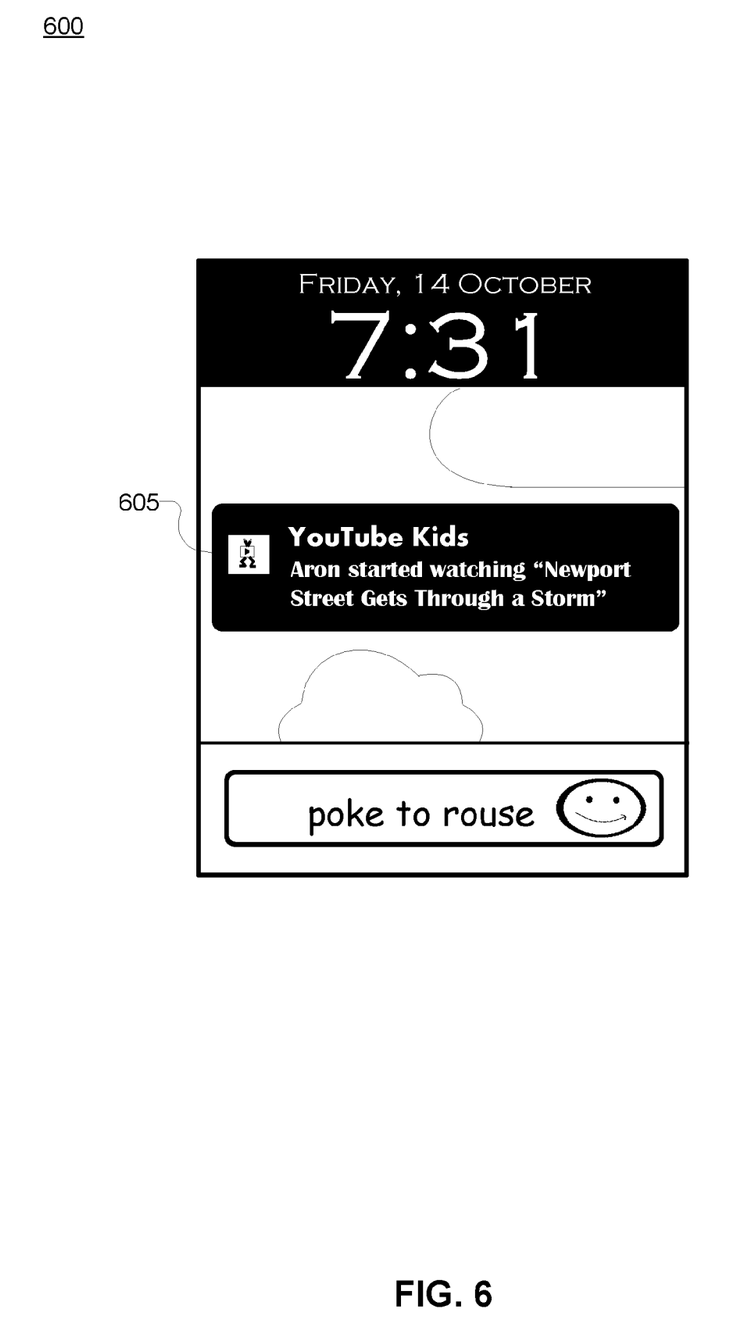
FIG. 6 is an example user interface to notify a supervising user about digital content presented to a user of a restricted account.

FIG. 6 is an example user interface 600 to notify a supervising user about digital content presented to a restricted user. In the illustrated embodiment, a notification 605 is presented in a lock-screen interface of the supervisor client device 110. A lock-screen interface refers to a reduced functionality interface typically displayed after powering on the supervisor client device 110 or after activating the supervisor client device 110 after a period of inactivity. The notification 605 identifies the restricted account and the title of a video that the restricted account is viewing. The notification 605 also includes an icon and text identifying an application on the supervisor client device 110 used to interact with the content server 130. In response to selection of the notification 605, the user interface 600 displays additional information about the video and controls for revoking restricted account access or for initiating synchronized presentation of the video.

VIII. Computer System

The client devices 110 and 120 and the content server 130 may be implemented using one or more computers. FIG. 7 is a high-level block diagram illustrating an example computer 700 usable to implement entities of the content sharing environment, in accordance with one embodiment.

The computer 700 includes at least one processor 702 (e.g., a central processing unit, a graphics processing unit) coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The processor 702 may include one or more processors 702 having one or more cores that execute instructions. The pointing device 714 is a mouse, track ball, or other type of pointing device, and is used in combination with the keyboard 710 to input data into the computer 700. The graphics adapter 712 displays digital content and other images and information on the display 718. The network adapter 716 couples the computer 700 to one or more computer networks (e.g., network 140).

The computer 700 is adapted to execute computer program modules for providing functionality described herein including presenting digital content, playlist lookup, and/or metadata generation. As used herein, the term "module" refers to computer program logic used to provide the specified functionality. Thus, a module can be implemented in hardware, firmware, and/or software. In one embodiment of a computer 700 that implements the content server 130, program modules such as the access controller 137 and the content interface module 132 are stored on the storage device 708, loaded into the memory 706, and executed by the processor 702.

The types of computers 700 used by the entities of the content sharing environment can vary depending upon the embodiment and the processing power required by the entity. For example, the client device 110 or 120 is a smart phone, tablet, laptop, or desktop computer. As another example, the content server 130 might comprise multiple blade servers working together to provide the functionality described herein. The computers 700 may contain duplicates of some components or may lack some of the components described above (e.g., a keyboard 710, a graphics adapter 712, a pointing device 714, a display 718). For example, the content server 130 run in a single computer 700 or multiple computers 700 communicating with each other through a network such as in a server farm.

IX. Additional Considerations

Although the foregoing description has focused primarily on videos for purposes of providing concrete illustration, various embodiments may incorporate different types of digital content. In one embodiment, the content server 130 contains audio files, which may be presented through an audio player instead of a video player. It should be noted that videos may contain audio files as well. As another embodiment, the content server 130 contains images and/or animations organized in albums instead of playlists. Rather than using a video or an audio player, these images and/or animations may be presented in a slideshow, which may contain auto-play functionality (e.g., the slideshow retrieves a next image or animation after a period of time). In yet another embodiment, the digital content includes text. Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content server 130 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for a content sharing environment. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

We claim:

1. A method comprising:
   receiving a designation of a delegate account authorized to control video access by a restricted account;
   receiving, from a restricted client device associated with the restricted account, a request to view a video;
   transmitting the requested video to the restricted client device in response to the received request;
   identifying a portion of the requested video that the restricted client device is presenting; and
   transmitting, by a processing device, the identified portion of the requested video to a delegate client device associated with the delegate account, the delegate client device configured to present the identified portion in synchronization with the restricted client device presenting the identified portion.

2. The method of claim 1, wherein the designation of the delegate account is received from an authorizing client device associated with an authorizing account.

3. The method of claim 1, further comprising:
   transmitting, to the delegate client device, a notification that the restricted client device is currently presenting the requested video.

4. The method of claim 1, further comprising:
   receiving an additional video captured by the restricted client device, the additional video captured concurrently with the restricted client device presenting the requested video; and
   transmitting the additional video to the delegate client device, the delegate client device configured to present the additional video concurrently with presenting the identified portion of the requested video.

5. The method of claim 1, further comprising:
   receiving, from the delegate client device, a request to revoke access to the requested video responsive to transmitting the identified portion of the requested video to the delegate client device; and
   responsive to the request to revoke access to the requested video, revoking access to the requested video by the restricted client device.

6. The method of claim 1, further comprising:
   transmitting, to the delegate client device, an authorization request to view the requested video; and
   receiving, from the delegate client device, authorization for the restricted account to view the requested video, wherein the requested video is transmitted to the restricted client device responsive to receiving authorization from the delegate client device.

7. The method of claim 6, wherein transmitting, to the delegate client device, the authorization request to view the requested video comprises:
   determining whether the restricted account is authorized to view the requested video by retrieving stored account permissions; and
   responsive to determining that the restricted account is not authorized to view the requested video, transmitting, to the delegate client device, the authorization request to view the requested video.

8. A non-transitory computer-readable storage medium comprising instructions, which when executed by a processing device, cause the processing device to perform operations comprising:
   receiving a designation of a delegate account authorized to control video access by a restricted account;
   receiving, from a restricted client device associated with the restricted account, a request to view a video;
   transmitting the requested video to the restricted client device in response to the received request;
   identifying a portion of the requested video that the restricted client device is presenting; and
   transmitting the identified portion of the requested video to a delegate client device associated with the delegate account, the delegate client device configured to present the identified portion in synchronization with the restricted client device presenting the identified portion.

9. The non-transitory computer-readable storage medium of claim 8, wherein the designation of the delegate account is received from an authorizing client device associated with an authorizing account.

10. The non-transitory computer-readable storage medium of claim 8, the operations further comprising:
    transmitting, to the delegate client device, a notification that the restricted client device is currently presenting the requested video.

11. The non-transitory computer-readable storage medium of claim 8, the operations further comprising:
    receiving an additional video captured by the restricted client device, the additional video captured concurrently with the restricted client device presenting the requested video; and
    transmitting the additional video to the delegate client device, the delegate client device configured to present the additional video concurrently with presenting the identified portion of the requested video.

12. The non-transitory computer-readable storage medium of claim 8, the operations further comprising:
    receiving, from the delegate client device, a request to revoke access to the requested video responsive to transmitting the identified portion of the requested video to the delegate client device; and
    responsive to the request to revoke access to the requested video, revoking access to the requested video by the restricted client device.

13. The non-transitory computer-readable storage medium of claim 8, the operations further comprising:
    transmitting, to the delegate client device, an authorization request to view the requested video; and
    receiving, from the delegate client device, authorization for the restricted account to view the requested video, wherein the requested video is transmitted to the restricted client device responsive to receiving authorization from the delegate client device.

14. The non-transitory computer-readable storage medium of claim 13, wherein to transmit, to the delegate client device, the authorization request to view the requested video, the operations further comprise:
    determining whether the restricted account is authorized to view the requested video by retrieving stored account permissions; and responsive to determining that the restricted account is not authorized to view the requested video, transmitting, to the delegate client device, the authorization request to view the requested video.

15. A system comprising:
a memory; and
a processor, operatively coupled with the memory, to:
receive a designation of a delegate account authorized to control video access by a restricted account;
receive, from a restricted client device associated with the restricted account, a request to view a video;
transmit the requested video to the restricted client device in response to the received request;
identify a portion of the requested video that the restricted client device is presenting; and
transmit the identified portion of the requested video to a delegate client device associated with the delegate account, the delegate client device configured to present the identified portion in synchronization with the restricted client device presenting the identified portion.

16. The system of claim 15, wherein the designation of the delegate account is received from an authorizing client device associated with an authorizing account.

17. The system of claim 15, wherein the processor is further to:
transmit, to the delegate client device, a notification that the restricted client device is currently presenting the requested video.

18. The system of claim 15, wherein the processor is further to:
receive an additional video captured by the restricted client device, the additional video captured concurrently with the restricted client device presenting the requested video; and
transmit the additional video to the delegate client device, the delegate client device configured to present the additional video concurrently with presenting the identified portion of the requested video.

19. The system of claim 15, wherein the processor is further to:
receive, from the delegate client device, a request to revoke access to the requested video responsive to transmitting the identified portion of the requested video to the delegate client device; and
responsive to the request to revoke access to the requested video, revoke access to the requested video by the restricted client device.

20. The system of claim 15, wherein the processor is further to:
transmit, to the delegate client device, an authorization request to view the requested video; and
receive, from the delegate client device, authorization for the restricted account to view the requested video, wherein the requested video is transmitted to the restricted client device responsive to receiving authorization from the delegate client device.

21. A method comprising:
receiving, from a restricted client device associated with the restricted account, a request to view a video;
transmitting the requested video to the restricted client device in response to the received request;
identifying a portion of the requested video that the restricted client device is presenting; and
transmitting, by a processing device, the identified portion of the requested video to a supervisor client device associated with a supervisor account, the supervisor client device configured to present the identified portion in synchronization with the restricted client device presenting the identified portion.

22. The method of claim 21, further comprising:
transmitting, to the supervisor client device, a notification that the restricted client device is currently presenting the requested video.

23. The method of claim 21, further comprising:
receiving an additional video captured by the restricted client device, the additional video captured concurrently with the restricted client device presenting the requested video; and
transmitting the additional video to the supervisor client device, the supervisor client device configured to present the additional video concurrently with presenting the identified portion of the requested video.

24. The method of claim 21, further comprising:
receiving, from the supervisor client device, a request to revoke access to the requested video responsive to transmitting the identified portion of the requested video to the supervisor client device; and
responsive to the request to revoke access to the requested video, revoking access to the requested video by the restricted client device.

25. The method of claim 21, further comprising:
transmitting, to the supervisor client device, an authorization request to view the requested video; and
receiving, from the supervisor client device, authorization for the restricted account to view the requested video;
wherein the requested video is transmitted to the restricted client device responsive to receiving authorization from the supervisor client device.

26. The method of claim 25, wherein transmitting, to the supervisor client device, the authorization request to view the requested video comprises:
determining whether the restricted account is authorized to view the requested video by retrieving stored account permissions; and
responsive to determining that the restricted account is not authorized to view the requested video, transmitting, to the supervisor e client device, the authorization request to view the requested video.

* * * * *